United States Patent [19]

Bott

[11] Patent Number: 4,837,944
[45] Date of Patent: Jun. 13, 1989

[54] PROCESS FOR THE FORMATION AND DRYING OF FILTER CAKE

[75] Inventor: Reinhard Bott, Karlsruhe, Fed. Rep. of Germany

[73] Assignee: Bokela Ingenieurgesellschaft fur Mechanische Verfahrenstechnik, Karlsruhe, Fed. Rep. of Germany

[21] Appl. No.: 58,198

[22] Filed: Jun. 4, 1987

[30] Foreign Application Priority Data

Sep. 2, 1986 [DE] Fed. Rep. of Germany ....... 3629805

[51] Int. Cl.⁴ .................................................. F26B 3/00
[52] U.S. Cl. ....................................... 34/22; 210/500.3; 210/500.38; 210/500.41; 210/771
[58] Field of Search ................... 34/117, 120, 22; 210/400, 401, 768, 769, 770, 771, 500.3, 500.38, 500.41

[56] References Cited

U.S. PATENT DOCUMENTS

| 2,997,176 | 8/1961 | Delmas | 210/768 |
|---|---|---|---|
| 3,338,411 | 8/1967 | von der Gathen et al. | 210/771 X |
| 4,177,228 | 12/1979 | Prolss | 210/500.38 X |
| 4,347,139 | 8/1982 | Hayashi | 210/500.3 X |
| 4,459,210 | 7/1984 | Murakami et al. | 210/500.3 X |
| 4,483,771 | 11/1984 | Koch | 210/500.3 X |
| 4,510,061 | 4/1985 | White | 210/769 |
| 4,541,972 | 9/1985 | Wernick | 210/500.3 X |
| 4,664,813 | 5/1987 | Schneider | 210/771 |
| 4,720,343 | 1/1988 | Walch et al. | 210/500.41 X |

FOREIGN PATENT DOCUMENTS

| 255118 | 12/1985 | Japan | 210/500.38 |
|---|---|---|---|
| 2115344 | 9/1983 | United Kingdom | 210/500.38 |

Primary Examiner—Steven E. Warner
Attorney, Agent, or Firm—Fleit, Jacobson, Cohn & Price

[57] ABSTRACT

In a process for the formation and removal of moisture from porous filter cake comprising individual solid particles on a filter medium by means of a fluid acting on the filter cake and which has a pressure difference compared with the filtrate behind the filter medium, the filter cake is economically freed from the suspension liquid by means of a differential pressure without or with only an insignificant fluid flow through the filter medium, in that a filter medium with a higher capillary intake pressure for the fluid than that of the filter cake is used and that a filtration pressure is applied to the fluid which is higher than the capillary intake pressure of the filter cake and equal to or smaller than the capillary intake pressure of the filter medium. Through increasing the intake pressure of the filter medium to above that of the filter cake, the penetration of the expelling fluid into the filter medium is prevented and consequently the filtration pressure is maintained, so that this brings about economic filtration.

21 Claims, 4 Drawing Sheets

PROCESS FOR THE FORMATION AND DRYING OF FILTER CAKE

BACKGROUND OF THE INVENTION

The present invention relates to a process for the formation and moisture extraction or drying of porous filter cake comprising individual solid particles on a filter medium by means of a fluid acting on the filter cake and having a differential pressure compared with the filtrate located behind the filter medium.

Cake-forming filtration is used e.g. in the preparation or conditioning of raw materials, such as ores, coal, etc., during the separation of sludges and slurries and similar processes. Conventionally the suspension is separated by immersing a filter medium, e.g. a monofilament, multifilament or a filter cloth and depositing the solid as a filter cake on the filter medium. Up to now the pores of the cloth have had a much larger diameter than most of the solid particles of the suspension, so that at the start of deposition a solid penetration through the filter medium occurs, which is undesired and must therefore be kept as small as possible. After solid particles have been attached to the filter medium for a certain time, the forming filter cake has narrower pores or capillaries than the filter medium and therefore holds back the further fine solid particles and itself acts as a filter.

After emerging from the suspension, this filter cake is dried. During vacuum filtration a fluid, i.e. another liquid or a gas and preferably air is sucked through the bed, or is forced through it in the case of pressure filtration. Moisture is initially extracted from the coarsest capillaries of the filter cake having a low intake capillary pressure and they are followed by the smaller capillaries with a higher intake capillary pressure. The drying process is continued until a requisite residual moisture content in the cake is reached. During the drying of the narrower capillaries, the drying fluid already flows through the emptied, larger capillaries and through the filter medium, so that it is only possible to maintain the pressure potential with increased energy expenditure on the part of the pressure unit. The drying fluid volume flow flowing through the cake during the drying time is a measure of the economics of the filtration process. In particular ultra-fine grain-rich or compressible filter cakes have a craking tendency during moisture extraction. The cracks extending from the cake surface to the filter medium cause a considerable drying fluid throughput, so that obtaining the pressure difference leads to an extremely high work expenditure and a high fluid throughput, which is extremely uneconomic.

Attempts have been made to reduce cracking in that the filter medium is subdivided into a plurality of small filter surfaces, between each of which is arranged a relatively wide separating web, so that the tensions occurring in the bed due to the capillary forces are reliably transferred up to the particular separating web and can be broken down or reduced there through the shrinkage of the cake. However, this measure suffers from the disadvantage that the separating webs lead to a considerable filter surface loss. Attempts have also been made to dry the filter cake by means of diaphragms or membranes, the latter being mainly constituted by sintered glass or ceramic filter plates. However, these filter plates suffer from the disadvantage that, as a result of their thickness and characteristics, they have such a high flow resistance, that the industrial use thereof is impossible. Due to the necessary high pressure difference, it is only possible to use pressure filtration, because with vacuum filtration it is only possible to reach pressures of 0.8 to 0.9 bar due to the vapour pressure of the liquid.

A further disadvantageous effect occurs with a suspension having dissolved salts. Following the expulsion of the suspension from the filter cake, the drying fluid, which is generally a gas flows through the filter cloth. However, this gas dries the filter cloth and cools it due to the removed evaporation enthalpy of the suspension. A further cooling occurs as a result of the gaseous state law due to the expansion of a gaseous fluid on flowing through the bed. Crystallization out of the dissolved salts occurs, so that the cloth gradually becomes clogged with the crystallized out salts and no longer has any filtering effect after a short time.

SUMMARY OF THE INVENTION

The problem of the present invention is to provide a process and apparatus suitable for the performance thereof permitting the economic removal of moisture from filter cake by means of a low differential pressure without or with only an insignificant fluid flow through the filter medium.

On the basis of the aforementioned process this problem is solved in that use is made of a filter medium with a higher capillary intake pressure for the fluid than that of the filter cake and in that the fluid is given a filtration pressure which is at least slightly higher than the capillary intake pressure of the filter cake and is equal to or less than the capillary intake pressure of the filter medium.

As a function of the particular process conditions, such as pore diameter, wettability of the filter medium by the suspension liquid, angle of contact between the filter medium and liquid surface, liquid surface tension, temperature, etc., the filter medium has a capillary intake pressure, which is higher than that of the filter cake.

By applying a filtration pressure to the fluid, which is higher than the capillary intake pressure of the filter cake, but lower than that of the filter medium, the suspension fluid is expelled from the filter cake by the filter medium. Firstly the coarsest capillaries and then the finer capillaries are dried. This process has the advantage that after removing the moisture from the coarsest particles, there is no fluid flow through the filter medium, because the intake pressure of the filter medium is too high for the fluid. Therefore the pressure difference applied is maintained, because there is no through-flow of the drying fluid and consequently no relaxation compared with the pressure behind the filter medium.

The cracks which form in the filter cake also lose significance, because the fluid breaking through the cracks merely passes up to the surface of the filter medium, but does not pass through it so that the pressure potential of the fluid is maintained and consequently the filter cake is further dried.

In addition, no part is any longer played by the crystallizing out effect in suspensions with dissolved salt, because only the suspension and not the drying fluid now flows through the filter medium, so that said fluid no longer dries out or cools the filter medium pores and brings about a crystallizing out of the dissolved salts, which would clog the pores.

For performing the present process, the invention makes use of an apparatus with a filter medium immersed in the suspension and receiving the solid particles on the surface, a stripping part which, following the emergence of the filter medium from the suspension and the drying thereof, removes the solid particles from the filter medium and optionally a cleaning device freeing the filter medium from settled solid particles. Disk, drum or belt filters are mainly used for the cake-forming filtration.

According to the invention the filter medium of the apparatus is constructed as a relatively thin membrane. The membrane has a capillary intake pressure, which is higher than that of the filter cake, so that the drying fluid in the case of a suitable pressure passes through the filter cake, but not the membrane. The membrane also has the advantage that it is constructed elastically and with limited thickness of approximately 0.5 mm, so that e.g. in the case of drum filters it can be used as a circulating filter medium and due to the limited thickness can be cleaned much more easily than sintered glass or ceramic filter plates with a ten times greater thickness, which also become clogged through the impurities in technical filter cakes.

According to another feature the maximum pore diameter of the membrane is equal to or smaller than the smallest diameter of the solid particles of the filter cake. This has the advantage that in the case of the filter cake building up in the suspension, there is no solid penetration, so that the filtration quality is significantly improved. The membrane can also be constructed in such a way that most of the pores have a smaller diameter than the solid particles of the filter cake. This advantageously reduces the flow resistance and there is an only insignificant solid penetration.

Compared with the filter cake, the membrane has a thickness which is approximately two decimal powers smaller. Due to the fluid permeability of the membrane, it can take filter cake in any desired thickness, despite the associated increasing cake cracking susceptibility.

To assist the stopping action against a flow of fluid through the membrane, as a function of the characteristics of the suspension, said membrane can have a hydrophilic or hydrophobic surface. This also has the advantage that the flow resistance for the suspension liquid is reduced and sticking of the filtered solid, i.e. the filter cake is prevented.

Compared with conventional filter cloths with a surface structure based on the actual cloth, the membrane can be better adapted to the process or the product in that the surface is made e.g. smooth, rough, structured, homogeneous or the like. In addition, the membrane surface is advantageously made chemically resistant to acids and/or bases. For example, so that it can be drawn on to any given filter surface, the membrane can be given any desired form, i.e. flexible or expandable or flat, curved, bent, etc. and can be packed in a random manner.

It is an essential characterizing feature of the inventive apparatus that, if necessary, the requisite mechanical stability of the membrane can be increased in that it is applied to a filter cloth with much larger pores or the membrane is fitted between two or more filter cloths with much larger pores in sandwich form. These filter cloths can be of a conventional nature, so as to absorb mechanical stresses and loads, such as tension, pressure, shear, etc. and protect the membrane.

A filter medium economy can advantageously be achieved in that the membrane is only applied to the filter fabric at the filter filtering points or is installed between filter cloths.

High loading capacity, flexibility and wear resistance of the membrane are obtained by making it from a synthetic material, such as cellulose acetate, plastic, such as polyamide, polysulphones or the like.

A simple and effective cleaning of the membrane following the removal of the filter cake is achieved in that the filter cleaning device is constructed as an ultrasonic bath, optionally with a focussed ultrasonic beam, a vapour or pressure water spraying plant, a suction plant or the like. It is also possible to use a dissolving bath or the like for removing settled solid particles and foreign bodies.

BRIEF DESCRIPTION OF THE DRAWINGS

The invention is described in greater detail hereinafter relative to a non-limitative embodiment and the attached drawings, wherein show.

DETAILED DESCRIPTION OF THE INVENTION

Figure 1:
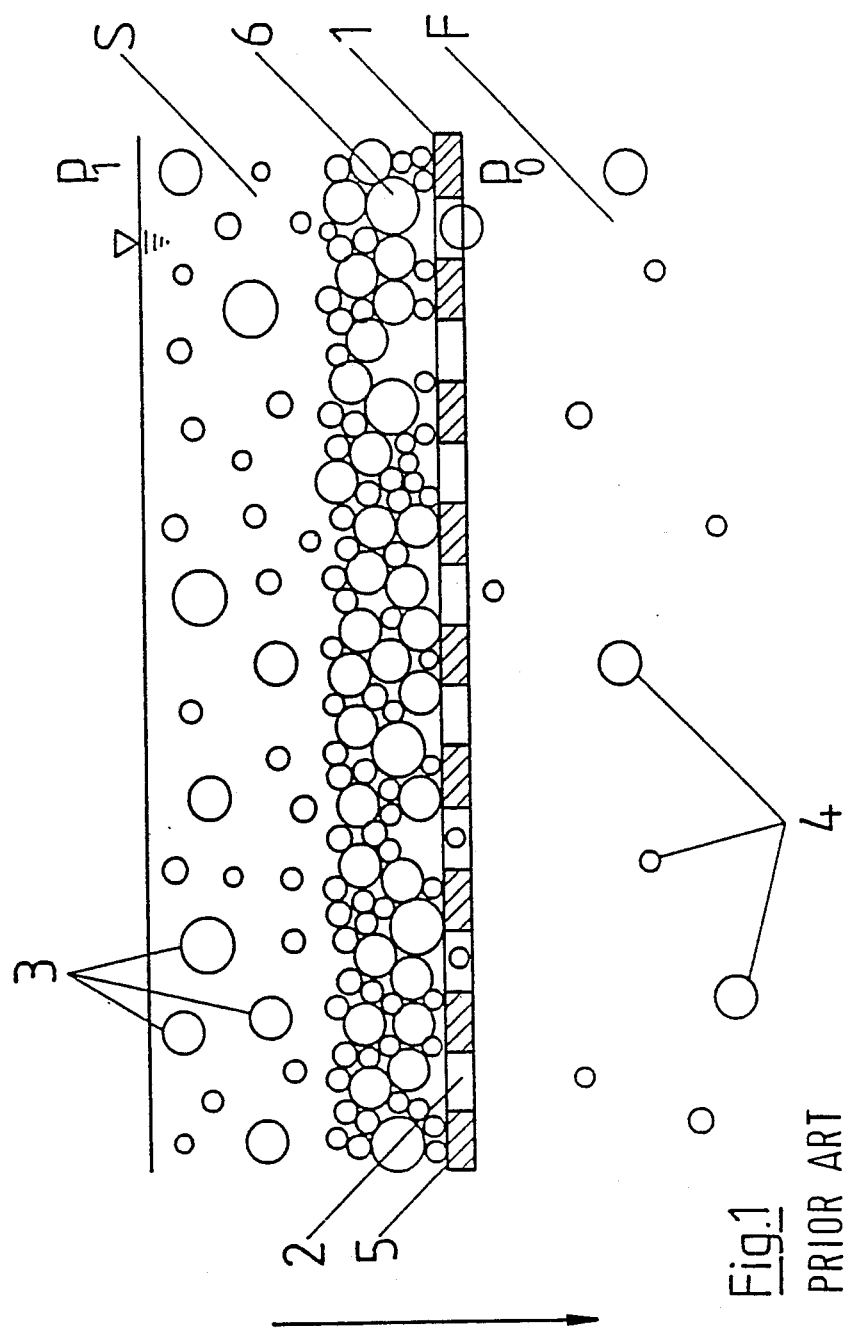
FIG. 1: A diagrammatic view of a conventional filter fabric with a filter cake being formed.

FIG. 1 shows a conventional filter cloth 1 with pores 2 located in a suspension S and solid particles 3 floating in the suspension liquid. A pressure $P_1$ is imparted to the suspension S and is higher than the pressure $P_0$ prevailing behind the filter cloth 2, so that suspension S and with it the solid particles 3 flow in the direction of filter cloth 1. Following an initial solid penetration 4 of the filtrate F located behind the conventional filter cloth 1 resulting from the large diameter of pores 2 compared with the solid particles 3, a porous filter cake 6 is formed on the suspension-side surface 5 of filter cloth 1.

The solid particles form capillaries 7, which are filled with suspension liquid. Following the emergence of the filter cake from suspension S, in the case of high tensions, caused by a drying of the pores and the resulting capillary forces, filter cake 6 can tear, accompanied by the formation of a crack 9 extending from surface 8 of cake 6 from the suspension-side filter medium surface 5. In the case of a large-pored filter medium, the drying fluid flows in almost unimpeded manner through said crack, so that the pressure difference formed through pressures $P_1$ and $P_0$ collapses.

Figure 2:
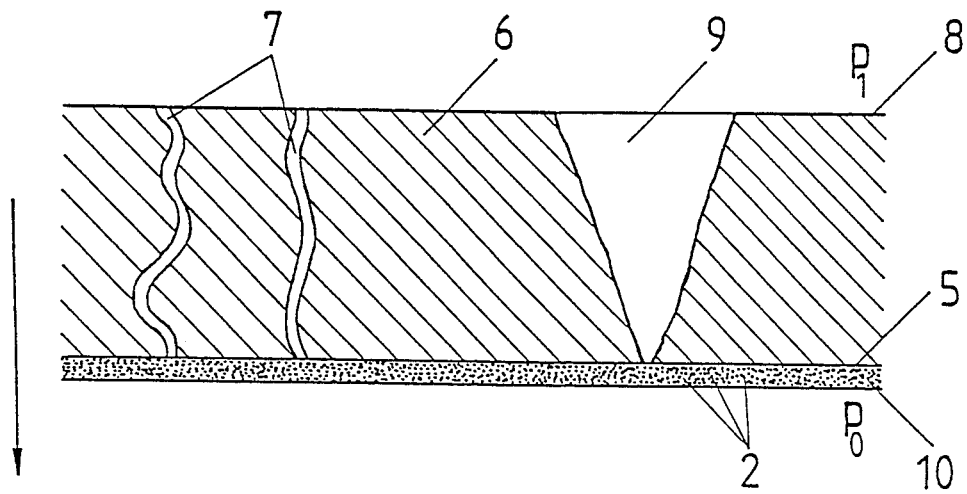
FIG. 2: A diagrammatic representation of a filter cake on a membrane.
Figure 3:
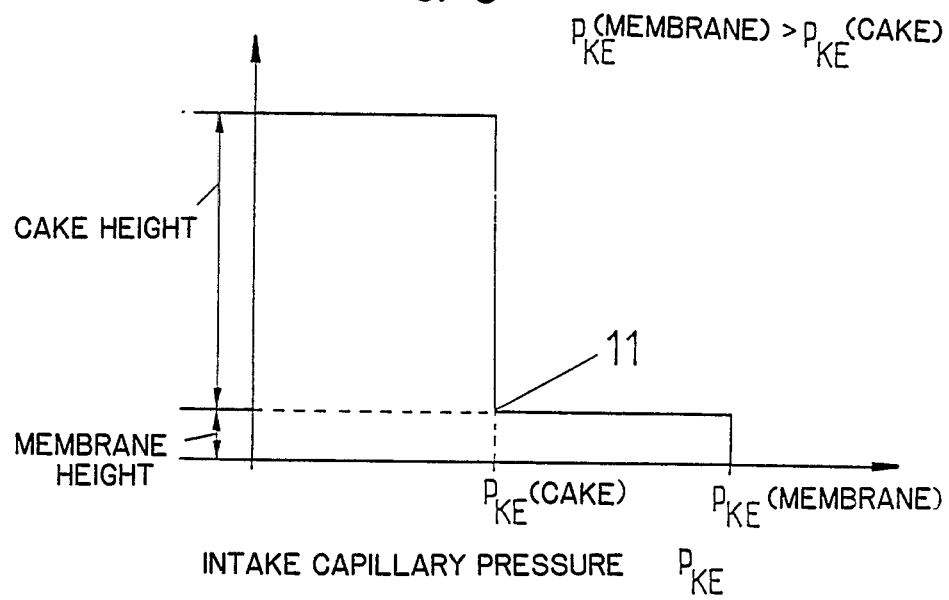
FIG. 3: A diagram of the configuration of the intake pressure corresponding to the capillaries shown in FIG. 2.

This is prevented by the inventive construction of the filter medium as membrane 10 and as shown in FIG. 2, in that the membrane 10 is provided with pores, whose diameter is smaller than that of the capillaries 7 of filter cake 6, so that, as a result of the smaller diameter of the filter medium pores, there is a higher capillary intake pressure for the drying fluid, e.g. the gas or the like on the suspension-side surface 5 than at filter cake 6, so that as a result of the difference of pressures $P_1$ and $P_0$ the suspension liquid can escape through pores 2, but the drying fluid is held back and consequently the pressure difference between $P_1$ and $P_0$ is maintained. For the inventive construction of the filter medium as membrane 10, FIG. 3 diagrammatically shows the size of the capillary intake pressure plotted on the vertical axis compared with the thickness of filter cake 6 and membrane 10. At 11 it is possible to see a clear rise in the intake pressure due to the smaller membrane pores 2.

Figure 4:
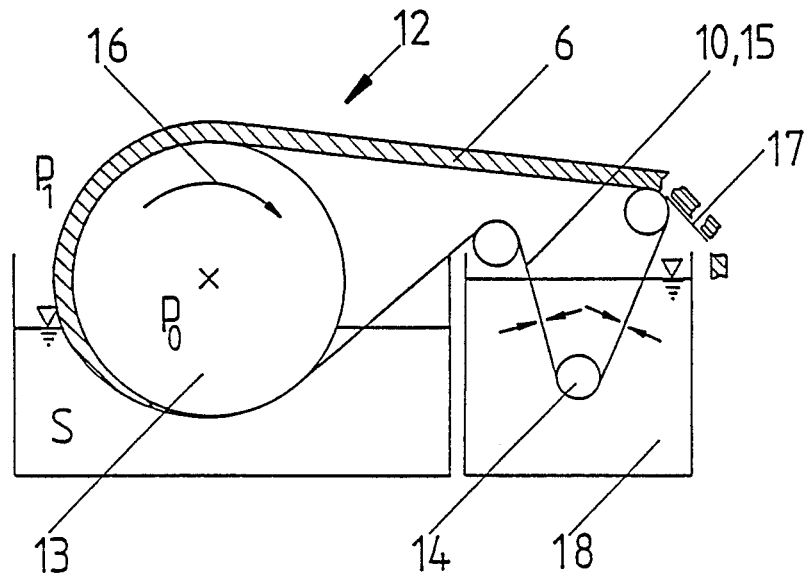
FIG. 4: A conventional drum filter.
Figure 5:
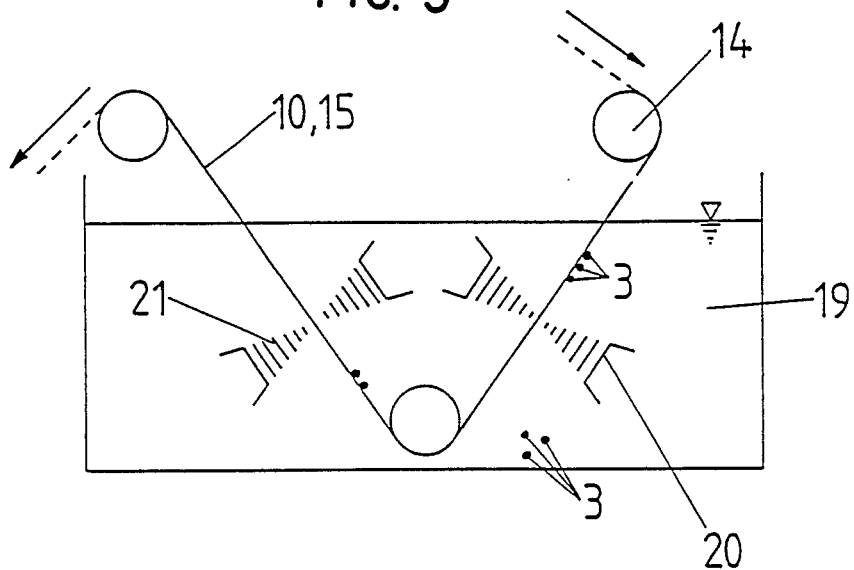
FIG. 5: A filter cleaning device.

FIG. 4 shows in exemplified manner a construction of draining filter cloth disposed about a conventional drum filter 12 with draining filter cloth. This construction has a drum 13 revolving in suspension S. The filter belt 6 formed on the inventive membrane 10 also runs over the same and guide pulleys 14. Following on to drum 13 in running direction 16, membrane 10 passes a stripping part 17, e.g. a blade which strips the dried filter cake 6 and is then deflected by means of guide pulleys 14 into a cleaning device 18. According to FIG. 5, cleaning device 18 comprises a cleaning bath 19 and ultrasonic transmitters 20, whose optionally focussed ultrasonic beam 21 detaches solid particles 3 which have settled on membrane 10. It is advantageous to provide at least one ultrasonic transmitter on each side of membrane 10.

Figure 6:
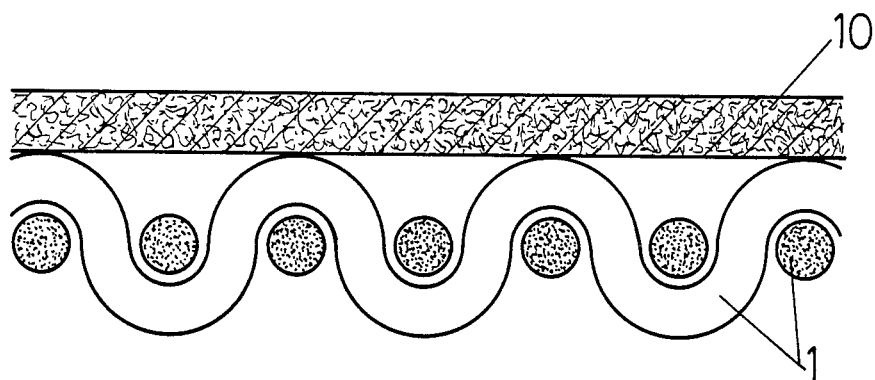
FIG. 6: A diagrammatic membrane arrangement.
Figure 7:
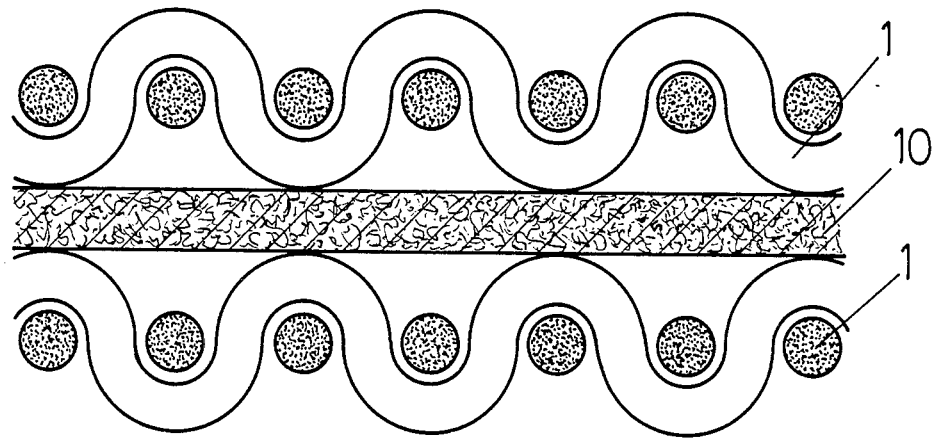
FIG. 7: A membrane arrangement in sandwich form.

To increase the mechanical stability and reduce the tensile, compressive, shear and other stressing, the membrane 10 is applied to a conventional, large-pored filter cloth 1, e.g. by means of a suitable adhesive (FIG. 6), or the membrane 10 is embedded between at least two large-pored filter cloths in sandwich form, e.g. also by means of a suitable adhesive (FIG. 7).

What is claimed is:

1. A process for forming and drying porous filter cake comprising the steps of:
   providing individual solid particles on a filter medium by means of a fluid acting on the filter cake,
   providing a pressure difference at opposite sides of the filter medium,
   using a filter medium with a higher capillary intake pressure for the fluid than a capillary intake pressure of the filter cake, and
   applying a filtration pressure to the fluid which is at least slightly larger than the capillary intake pressure of the filter cake and is equal to or smaller than the capillary intake pressure of the filter medium.

2. A method for forming and drying a porous filter cake from a suspension, comprising the steps of:
   causing said filter cake to emerge from said suspension on a filter medium having a predetermined intake pressure;
   forming said filter cake with pores having a smaller capillary intake pressure than said predetermined intake pressure;
   applying a drying fluid on said filter cake at a pressure creating a pressure difference at the side of said filter medium opposite to said cake;
   controlling said pressure difference so that the pressure at which said drying fluid is applied is at least slightly larger than said capillary intake pressure of said filter cake and is equal or smaller than said capillary intake pressure of said filter medium.

3. An apparatus for forming a porous filter cake emerging from a suspension and drying said filter cake, comprising:
   a filter medium absorbing solid particles floating in said suspension to form said porous filter cake,
   a stripping part removing the solid particles from the filter medium following the emergence of the filter medium from the suspension and after washing or drying of said filter medium, and
   a cleaning device freeing the filter medium from firmly settled, solid filter cake particles, wherein the filter medium is constructed as a membrane having pores, said pores of said membrane having a maximum diameter which is equal to or smaller than the smallest diameter of pores of said filter cake.

4. An apparatus according to claim 3, wherein the membrane has a thickness smaller by two decimal powers than the filter cake.

5. An apparatus according to claim 3, wherein the membrane has a hydrophilic surface.

6. An apparatus according to claim 3, wherein the membrane has a hydrophobic surface.

7. An apparatus according to claim 3, wherein the membrane surface is made chemically resistant to acids and bases.

8. An apparatus according to claim 3, wherein the membrane is applied to a filter cloth with much larger pores than the pores of said membrane.

9. An apparatus according to claim 8, wherein the membrane is only applied to the filter cloth at filter filtering surfaces or is placed between filter cloths.

10. An apparatus according to claim 3, wherein the membrane is installed in sandwich form between two or more filter cloths with substantially larger pores than the pores of said membrane.

11. An apparatus according to claim 10, wherein the membrane is only applied to the filter cloth at filter filtering surfaces or is fitted between the filter cloths.

12. An apparatus according to claim 3, wherein the membrane is made from a synthetic material.

13. An apparatus according to claim 12, wherein said synthetic material is one of cellulose acetate, polyamide plastic and polysulphone plastic.

14. An apparatus according to claim 3, and further comprising a drum filter, and a draining cloth disposed about said drum filter, wherein the draining cloth is provided with the membrane over its entire surface.

15. An apparatus according to claim 14, wherein the cleanin device is constructed as an ultrasonic bath, optionally with a focussed ultrasonic beam, a steam or pressure water spraying plant, a suction plant or the like.

16. An apparatus according to claim 3, wherein most of the pores of the membrane have a smaller diameter than the pores of the filter cake.

17. An apparatus according to claim 16, wherein the membrane is fitted in sandwich form between two or more filter cloths with substantially larger pores than the pores of said membrane.

18. An apparatus according to claim 16, wherein the membrane surface is chemically resistant to acids and bases.

19. An apparatus according to claim 16, wherein the membrane has a thickness smaller by two decimal powers than the filter cake.

20. An apparatus according to claim 16, wherein the membrane is made from a synthetic material.

21. An apparatus according to claim 20, wherein said synthetic material is one of cellulose acetate, polyamide plastic and polysulphone plastic.

* * * * *

REEXAMINATION CERTIFICATE (1971st)

United States Patent [19]

Bott

[11] B1 4,837,944

[45] Certificate Issued Apr. 6, 1993

[54] PROCESS FOR THE FORMATION AND DRYING OF FILTER CAKE

[75] Inventor: Reinhard Bott, Karlsruhe, Fed. Rep. of Germany

[73] Assignee: Bokela Ingenieurgesellschaft fur Mechanische Verfahrenstechnik, Karlsruhe, Fed. Rep. of Germany

Reexamination Request:
No. 90/002,517, Nov. 22, 1991

Reexamination Certificate for:
Patent No.: 4,837,944
Issued: Jun. 13, 1989
Appl. No.: 58,198
Filed: Jun. 4, 1987

[30] Foreign Application Priority Data

Sep. 2, 1986 [DE] Fed. Rep. of Germany ....... 3629805

[51] Int. Cl.⁵ .............................................. F26B 3/00
[52] U.S. Cl. .................... 34/22; 210/500.3; 210/500.38; 210/500.41; 210/771
[58] Field of Search ............... 34/117, 120, 22, 15, 34/92, 9, 16, 95; 210/400, 401, 768, 769, 770, 771, 500.3, 500.38, 500.41

[56] References Cited

U.S. PATENT DOCUMENTS

4,357,758 11/1982 Lampinen ................................. 34/9

OTHER PUBLICATIONS

H. Anlauf, "Entfeuchtung von Filter-Kuchen bei der Vakuum-, Druck-und Druck-Vakuum Filtration" Reihe 3: Verfahrenstechnik nr. 114 VDI Verlag 1986.
Reinhard A. Bott, "Zur Kontinuierlichen Druckfiltration" Dissertation, Dec. 21, 1985.

*Primary Examiner*—Henry A. Bennett

[57] ABSTRACT

In a process for the formation and removal of moisture from porous filter cake comprising individual solid particles on a filter medium by means of a fluid acting on the filter cake and which has a pressure difference compared with the filtrate behind the filter medium, the filter cake is economically freed from the suspension liquid by means of a differential pressure without or with only an insignificant fluid flow through the filter medium, in that a filter medium with a higher capillary intake pressure for the fluid than that of the filter cake is used and that a filtration pressure is applied to the fluid which is higher than the capillary intake pressure of the filter cake and equal to or smaller than the capillary intake pressure of the filter medium. Through increasing the intake pressure of the filter medium to above that of the filter cake, the penetration of the expelling fluid into the filter medium is prevented and consequently the filtration pressure is maintained, so that this brings about economic filtration.

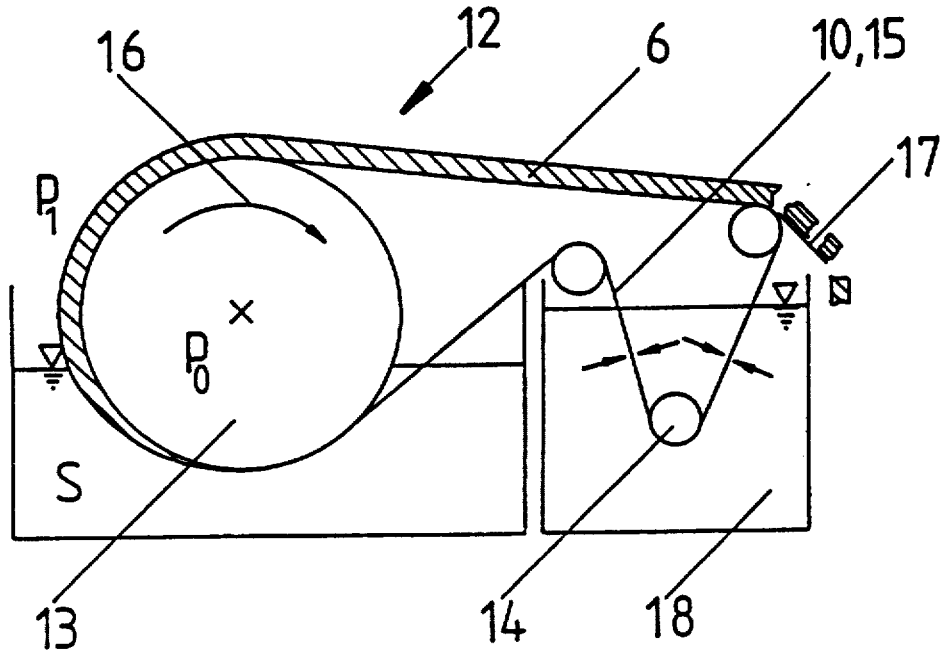

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–21 is confirmed.

Claim 1 is determined to be patentable as amended.

1. A process for forming and drying porous filter cake comprising the steps of:

[providing] *forming said filter cake by causing* individual solid particles *to emerge from a suspension and depositing said individual solid particles* on a filter medium by means of a fluid acting on the filter cake, providing a pressure difference at opposite sides of the filter medium, using a filter medium with a higher capillary intake pressure for the fluid than a capillary intake pressure of the filter cake, and applying a filtration pressure to the fluid which is at least slightly larger than the capillary intake pressure of the filter cake and is equal to or smaller than the capillary intake pressure of the filter medium.

* * * * *